United States Patent
Bertocchi (10) Patent No.: US 11,044,934 B2
(45) Date of Patent: Jun. 29, 2021

(54) METHOD FOR TREATING FOOD PRODUCTS OF VEGETABLE ORIGIN DESTINED TO BE USED FOR EXTRACTING PUREE, OR JUICE, AND MACHINE FOR CARRYING OUT SUCH METHOD

(71) Applicant: Alessandro Bertocchi, Parma (IT)

(72) Inventor: Alessandro Bertocchi, Parma (IT)

( * ) Notice: Subject to any disclaimer, the term of this patent is extended or adjusted under 35 U.S.C. 154(b) by 469 days.

(21) Appl. No.: 15/561,153

(22) PCT Filed: Mar. 30, 2016

(86) PCT No.: PCT/IB2016/051799
§ 371 (c)(1),
(2) Date: Sep. 25, 2017

(87) PCT Pub. No.: WO2016/157095
PCT Pub. Date: Oct. 6, 2016

(65) Prior Publication Data
US 2018/0049461 A1    Feb. 22, 2018

(30) Foreign Application Priority Data

Apr. 2, 2015  (IT) .............................. PI2015A000024

(51) Int. Cl.
*A23N 1/02*   (2006.01)
*B30B 9/18*   (2006.01)
(Continued)

(52) U.S. Cl.
CPC .................. *A23N 1/02* (2013.01); *B30B 9/12* (2013.01); *B30B 9/124* (2013.01); *B30B 9/125* (2013.01);
(Continued)

(58) Field of Classification Search
CPC ......... B02C 2/042; A47J 19/00; A47J 19/025; A23N 1/02; B30B 9/12; B30B 9/124;
(Continued)

(56) References Cited

U.S. PATENT DOCUMENTS

| 4,643,085 A | 2/1987 | Bertocchi |
| 5,779,166 A * | 7/1998 | Ruokonen ................. B02C 2/06 241/213 |

(Continued)

FOREIGN PATENT DOCUMENTS

| EP | 0 511 174 A1 | 10/1992 |
| FR | 754738 A | 11/1933 |

(Continued)

OTHER PUBLICATIONS

French to English machine translation of FR 2036597, published in 1970.*
(Continued)

*Primary Examiner* — Phuong T Nguyen
*Assistant Examiner* — Bonita Khlok
(74) *Attorney, Agent, or Firm* — Ladas & Parry LLP; Malcolm J. MacDonald (57) ABSTRACT

A method for treating a food product of vegetable origin, including the steps of pushing, by means of a pushing device, the food product within a treatment cavity. This is defined between an internal surface of a fixed hollow body, or stator, and an external surface having conical shape of a rotor, and has an inlet mouth through which the food product of vegetable origin is introduced within the same and an outlet mouth through which the treated vegetable food product exits the cavity. The treatment cavity has a size which decreases going from the inlet mouth to the outlet mouth. It is provided a rotation of the rotor within the stator about a rotation axis. The combination of the rotation and of the pushing that are carried out by the machines produce a partial crushing of the food product of vegetable origin within the treatment cavity.

12 Claims, 8 Drawing Sheets

(51) Int. Cl.
*B30B 9/12* (2006.01)
*B30B 15/34* (2006.01)

(52) U.S. Cl.
CPC ............... *B30B 9/127* (2013.01); *B30B 9/18* (2013.01); *B30B 15/34* (2013.01)

(58) Field of Classification Search
CPC ........... B30B 9/125; B30B 9/127; B30B 9/18; B30B 15/34
USPC .......... 241/213; 99/492, 503, 504, 510, 512, 99/483, 501, 511, 569
See application file for complete search history.

(56) References Cited

U.S. PATENT DOCUMENTS

| | | |
|---|---|---|
| 5,906,154 A | 5/1999 | Yoon et al. |
| 2013/0074707 A1 | 3/2013 | Asbury et al. |
| 2014/0020571 A1* | 1/2014 | Bajema ................... A23N 5/08 99/569 |
| 2016/0008818 A1* | 1/2016 | Ha ........................... B02C 2/06 241/213 |

FOREIGN PATENT DOCUMENTS

| | | |
|---|---|---|
| FR | 2036597 * | 3/1969 |
| FR | 2036597 A5 | 12/1970 |
| IT | 1199392 B | 12/1988 |
| IT | 1249363 B | 2/1995 |
| WO | 2004/091323 A1 | 10/2004 |
| WO | 2005/039308 A2 | 5/2005 |

OTHER PUBLICATIONS

English translation to FR2036597 (Year: 1969).*
International Search Report and Written Opinion dated Jul. 8, 2016 for Application No. PCT/IB2016/051799.
Espacenet English abstract of FR 2,036,597 A5.

* cited by examiner

METHOD FOR TREATING FOOD PRODUCTS OF VEGETABLE ORIGIN DESTINED TO BE USED FOR EXTRACTING PUREE, OR JUICE, AND MACHINE FOR CARRYING OUT SUCH METHOD

FIELD OF THE INVENTION

The present invention relates to the field of the food industry, and in particular it relates to a method for treating food products of vegetable origin destined to the extraction processes of puree, or juice from fruit.

Furthermore, the invention relates to a machine and a plant for treating food products of vegetable origin that carries out such a method.

BACKGROUND OF THE INVENTION

As well known, many kinds of plants exist for extracting juices, or puree, from food products of vegetable origin, in particular fruit.

Normally, in a first step, before the extraction, the product is softened, or ground, more, or less, finely and then, in a second step, it is introduced in a machine, usually an extracting machine, which separates the softened product, in a main product, i.e. the juice, or puree, and in a waste product comprising the seeds, the peels, etc. The extracting machine of prior art provides a fixed structure which comprises a perforated sheet of cylindrical, or conical, shape, that is known as "sieve", and a rotor, which is equipped with blades and which rotates within the sieve. The rotor is mounted on a shaft and it is caused to quickly rotate by a motor group. In particular, the ground, or softened, product coming from the machine positioned upstream of the extracting machine, is radially pushed by centrifugal forces against the sieve. In this way, the puree and the liquid part of the product are filtered through the holes and then conveyed towards the outlet in order to be, then, submitted to further treatments. Instead, the parts that do not pass through the sieve run axially through the sieve and are conveyed towards another outlet that is positioned at the opposite side with respect to the inlet and discharged from the machine. At this regard see IT1199392.

A known process, for example, is the extraction at room temperature. This can be carried out in two steps: a first softening step of the pulps by a series of pulses in quick succession and a second step of separation of the useful part (puree, or juice) from the solid parts that have to be rejected, that is carried out in an extracting machine, as above disclosed.

In the softening step the pulses in quick succession are obtained by means of a cylindrical, or conical, body or stator, which is provided with projections at the internal surface, combined with a rotor provided with blades that rotate within the stator pushing for centrifugal forces the pulps against the projections, producing the pulses which cause the softening. See at this regard IT1249363.

In the extraction at room temperature, the softening and the extraction steps can be carried out by a same compact unit having only one motor: the rotors are mounted on a same axis and, therefore, rotate at a same speed. Instead, a further solution provides two independent motors, one motor for actuating the rotor of the softening machine, and another motor for actuating the rotor of the extracting machine. This solution allows to treat products that are more, or less, sensitive to the softening in different way, and in order to better control the separation between the puree and the solid parts. See for example PI2003A000081.

However, in case of food product of vegetable origin having a big stone, as is the case of the apricots, of the peaches, of the plums, etc., the softening machines of prior art, as those above disclosed, can have some drawbacks. In fact, if the fruit is introduced as it is within the machine, the crushing of the product that is produced by the rotation of the rotor, causes the stone to shatter, or at least to splinter. Therefore, the fragments of the stone that are produced in this step can flow in the main product, i.e. the puree, or the juice, obtained, as above disclosed, in the subsequent step.

There is a similar drawback also if the desired final product is "apple sauce", i.e. apple puree. Also in this case, in fact, using the softening machines of prior art, the crushing of the product at the central part of the apple, where the seeds are collected, causes a passage of the seeds in the main product and an undesired browning of the final product.

Therefore, if the fruits have a big stone, machines have been designed, that are called "stoners", that separates the stone from the pulp.

However, these machines are not effective, in addition to be structurally complex.

Examples of machines with the above drawbacks are disclosed.

SUMMARY OF THE INVENTION

It is, therefore, an object of the invention to provide a method for treating food products of vegetable origin destined to the extraction of juice of fruit, or puree, that is able to overcome the above disclosed drawbacks of the known processes.

It is, in particular, object of the invention to provide such a method that is able to avoid the crushing of the stone, or at least of the central part of the fruit, in such a way to avoid to pollute the main product, i.e. puree, or juice, that is obtained in the subsequent working steps.

It is also aim of the invention to provide a machine for treating food products of vegetable origin destined to the extraction of juice of fruit, or puree, that has the same advantages.

It is a further object of the invention to provide a treatment plant of food products of vegetable origin for producing juice of fruit, or puree, that has the same advantages.

These and other objects are achieved by a method for treating, in particular softening, a food product of vegetable origin, in particular fruit, whose main characteristic is to comprise the steps of:

pushing, by means of a pushing device, said food product of vegetable origin within a treatment cavity, said treatment cavity being defined between an internal surface of a fixed hollow body, or stator, and an external surface of a rotor having a conical shape, said treatment cavity having an inlet mouth through which said food product of vegetable origin is introduced within the treatment cavity and an outlet mouth through which said vegetable food product exits said cavity, once treated, said treatment cavity having a size, which decreases going from said inlet mouth towards said outlet mouth;

rotating said rotor within said stator about a rotation axis;

partially crushing said food product of vegetable origin within said treatment cavity, in particular said partially crushing being caused by a combination of said push and of said rotation of the rotor.

Advantageously, the partially crushing is configured in such a way that it does not involve the central part of the food product of vegetable origin.

In particular, the step of partially crushing is such that it does not involve the endocarp, i.e. the stone of the fruit, that, therefore remains intact. In this way, it is prevented that the ligneous part of the treated product can "pollute" the final product modifying the organoleptic properties of the same with respect to the desired one.

According to another aspect of the invention, a machine for preparing vegetable pulp destined to the extraction of juice, or puree, comprises:

- a fixed hollow body, or stator, provided with an internal surface;
- a rotor pivotally mounted about a rotation axis within said fixed hollow body, said rotor provided with an external surface, between said internal surface of said stator and said external surface of said rotor being defined a treatment cavity within which said vegetable food product is introduced through an inlet mouth in such a way to be subjected to said treatment and from which, once treated, it exits through an outlet mouth;
- a motor group arranged to cause said rotor to rotate about a rotation axis;
- wherein the rotor has a conical shape and said inlet mouth has a size, in particular an area, that is higher than the size of said outlet mouth and wherein a pushing device is, furthermore, provided arranged to feed said starting vegetable food product in said treatment cavity through said inlet mouth, said rotor and said pushing device being configured in such a way to produce a selective "crushing" of the vegetable food product during its crossing of said treatment cavity. In particular, the selective crushing does not involve the central part of the vegetable food product.

More precisely, the selective crushing is such that it does not involve the endocarp, i.e. the stone, if the fruits have big stones, as peaches, apricots, plums, etc., or at least the central part of the fruit, in particular in case of apples, pears, etc. In this way, the drawbacks disclosed in the introductory part and that are found in the machines of prior art for treating these kind of products are avoided.

Preferably, the internal surface of the stator and the external surface of the rotor are arranged to be positioned, in use, at a distance that is substantially equal, or slightly higher, than the size of the stone, or the central part, or core, of the treated fruit, in such a way that the crushing produced by the machine, in operating conditions, does not involve the above disclosed stone, or the central part, of the fruit.

Advantageously, the external surface of the rotor is provided with a plurality of protruding members arranged to produce a rotation movement in the product positioned in the cavity. In this way, in particular the effectiveness of the crushing force exerted on the treated vegetable food product is increased.

Advantageously, each protruding member of the plurality of protruding members has a "twisted" shape, i.e. curved, and configured in such a way to adjust the advancing speed of the vegetable food product through said treatment cavity. In particular, depending on the shape of the protruding members and on their spatial orientation, it is possible to speed up, or in case of need to slacken, the advancing of the treated product along the treatment cavity. In fact, depending on how the protruding members are oriented it is possible to produce an advancing impulse, or to restrain, the product advancing within the treatment cavity.

Advantageously, a movement device is provided arranged to relatively move the rotor and the stator along an axial direction in order to position them in a predetermined relative axial position. Furthermore, removable blocking members are provided arranged to block said rotor with respect to said stator in said predetermined relative axial position.

Advantageously, the rotor is mounted on a rotation shaft actuated by the motor group with freedom to move axially relative to the same, in such a way that the rotor can be positioned in a predetermined relative axial position with respect to the stator.

In particular, also the internal surface of the stator can have a substantially conical shape.

Advantageously, the movement device is arranged to position the stator and the rotor in a relative position such that the internal surface of the stator and the external surface of the rotor are at a distance corresponding to the kind of fruit to be treated, and precisely to the size of the stone of the same, or the size of the central part, or core, of the apple.

Advantageously, the internal surface of the stator is provided with a plurality of protuberances alternated to a plurality of recesses.

According to another aspect of the invention, a treatment plant for treating food product of vegetable origin, according to any previous claim, is characterised in that it comprises:

- a treatment machine as above disclosed and comprising an inlet through which the product to be treated is fed, and an outlet through which said treated product exits said machine;
- a separation machine positioned downstream of said treatment machine and arranged to separate said treated product of vegetable origin exiting the treatment machine, through said outlet, in a waste product and in a main product comprising puree, or juice.

BRIEF DESCRIPTION OF THE DRAWINGS

The invention will now illustrated with the following description of an exemplary embodiment thereof, exemplifying but not limitative, with reference to the attached drawings wherein:

FIG. 1 diagrammatically shows a first embodiment of a machine, according to the invention, for treating a food product of vegetable origin destined to the extraction of puree, or juice;

FIGS. 2A and 3B diagrammatically show, as an example, two possible kinds of fruits and, respectively, one provided with a big stone and the other provided with a large central part that can be treated by the machine according to the invention;

DESCRIPTION OF PREFERRED EXEMPLARY EMBODIMENTS

Figures 1, 2A, 2B:
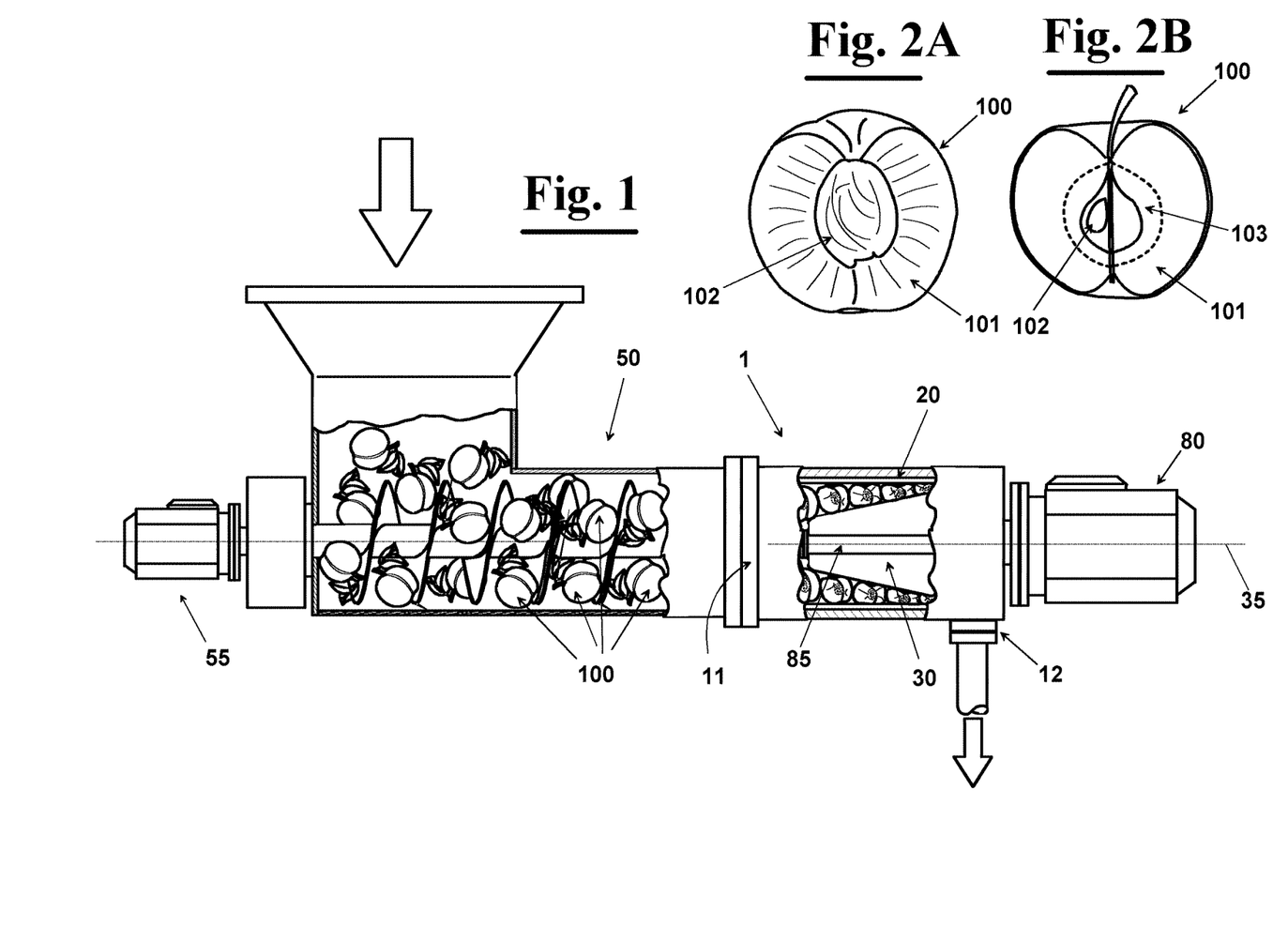

In FIG. 1 a machine 1, according to the invention, for separating the vegetable pulp destined to the extraction of juice and/or puree, is shown as an example. The machine 1 comprises an inlet 11 through which a starting vegetable food product 100 is arranged to be introduced inside of it, and an outlet 12 through which the treated vegetable food product 105 is arranged to exit after being submitted to a predetermined treatment. Inside the machine 1 are mounted a fixed hollow body 20, or stator, provided with an internal surface 21, and a rotor 30 provided with an external surface 31, having a conical shape and pivotally mounted about a rotation axis 35 within the fixed hollow body 20. More precisely, between the internal surface 21 of the stator 20 and the external surface 31 of the rotor 30 a treatment cavity 40 is defined in which the food product of vegetable origin 100 is introduced through an inlet mouth 41 in order to be submitted to the above disclosed treatment and from which it exits through an outlet mouth 42, after the treatment. The machine 1 is, furthermore, provided with a motor group arranged to cause the rotor 30 to rotate about the rotation axis 35. More in detail, all the food product of vegetable origin 100 that is entered in the machine 1 through the inlet 11 exits from outlet 12.

Figure 3:
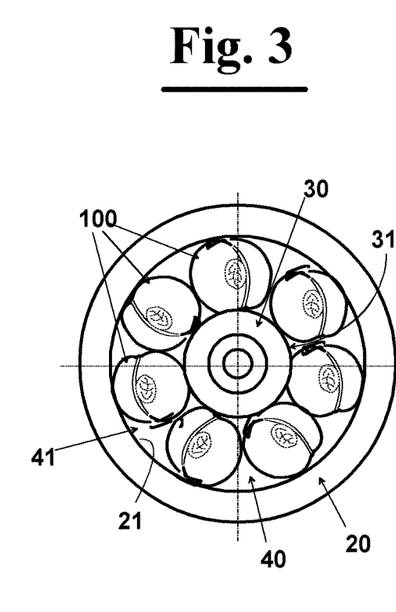
FIG. 3 diagrammatically shows the inlet mouth of the treatment cavity of the treatment machine of FIG. 1.
Figure 4:
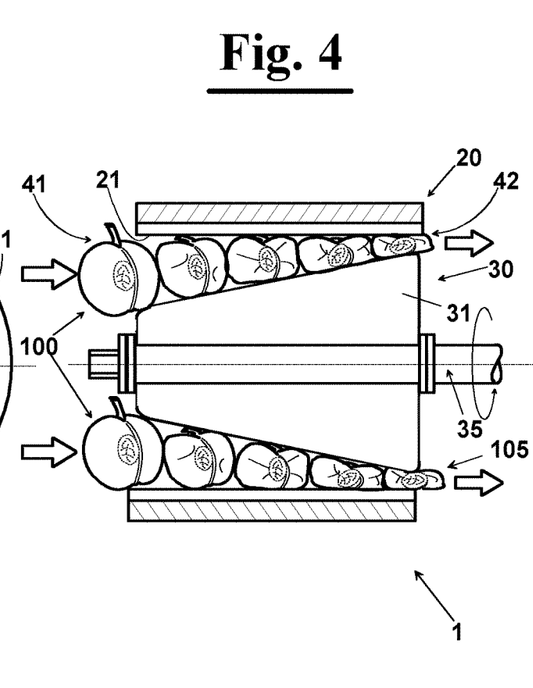
FIG. 4 shows a diagram of operation of the treatment machine of FIG. 1 in operating conditions.
Figure 5:
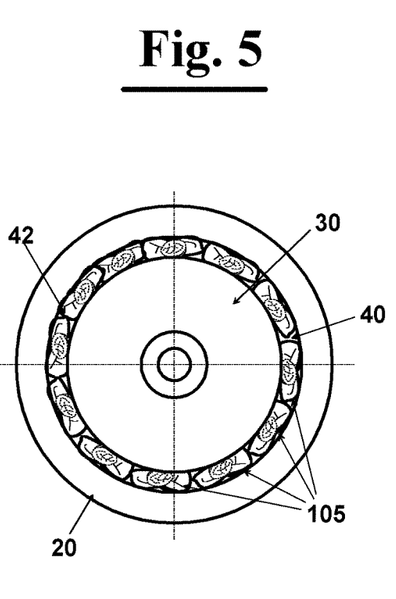
FIG. 5 diagrammatically shows the outlet mouth of the treatment cavity of the treatment machine of FIG. 1.

According to the invention, and diagrammatically shown in FIGS. 3 to 5, the treatment cavity 40 has a size that decreases going from the inlet mouth 41 to the outlet mouth 42. Therefore, the inlet mouth 41 (FIG. 3) has a section, or size, that is higher than that of the outlet mouth 42 (FIG. 5). Furthermore, a pushing device 50, is provided, for example an Archimedean screw operated by a motor 55, arranged to feed the starting vegetable food product 100 within the treatment cavity 40 through the inlet mouth 41. More in detail, the combination of the rotation of the rotor 30 and the push carried out by the pushing device 50 cause a partial "crushing" of the vegetable food product through the treatment cavity 40.

More precisely, the food product of vegetable origin 100 is a fruit, for example, peach, or apricot, or a different fruit having a fleshy part, or mesocarp 101, and a stone, or endocarp, 102, having a big mesocarp 101, in particular a height that is half of the height of the mesocarp 102. For this kind of fruit, in particular, the machine 1, according to the invention, allows to overcome the problems of the prior art machines in which, during the treatment, in particular the softening of the fruit, a chipping of the stone is produced, therefore, "a pollution" with fragments of the stone of the main product, in particular puree, or juice, obtained at the end of the whole process of which the treatment carried out by machine 1 is only one of the provided steps. The machine 1, in fact, generally carries out a first treatment of the starting product preparing the same to the following steps, that are carried out, for example, by an extracting machine, or a similar machine, which separates the starting product in a main product, i.e. puree, or juice, and a waste product comprising the peels, the stones, etc. of the fruit. The machine 1, according to the invention, is advantageous with respect to the solutions of prior art also in the case that the fruit to be treated has not a large stone 102, as in the above disclosed situation, but at least a central part (in FIG. 2B substantially the area 103 bounded within the broken line), where the seeds, or the stones, are present, as is the case, for example, of the apple. Also for this kind of fruit, in fact, it is preferable to avoid that the crushing produced by the treatment machine can involve the central part, in order to avoid to "pollute" the main product jeopardizing its quality, analogously to what has been above disclosed for the fruits with a big endocarp.

In particular, the machine 1 according to the invention allows to avoid this kind of drawback because the treatment cavity 40, in particular the outlet mouth 42 of the same, is dimensioned in such a way to press only partially the fruit 100, i.e. to soften the mesocarp, but avoiding to crush the stone 102 of the same, or at least the central part of the fruit where the seeds are collected. The size of the stone 102, or of the central part 103, of the treated fruit, can be preliminarily selected on the basis of predetermined experimental data. These can be, for example, indicated in a table, for example available in literature, or determined through experimental tests by workers, in which an average size of the stone 102, or the central part 103, is associated to each kind of fruit.

Figure 6:
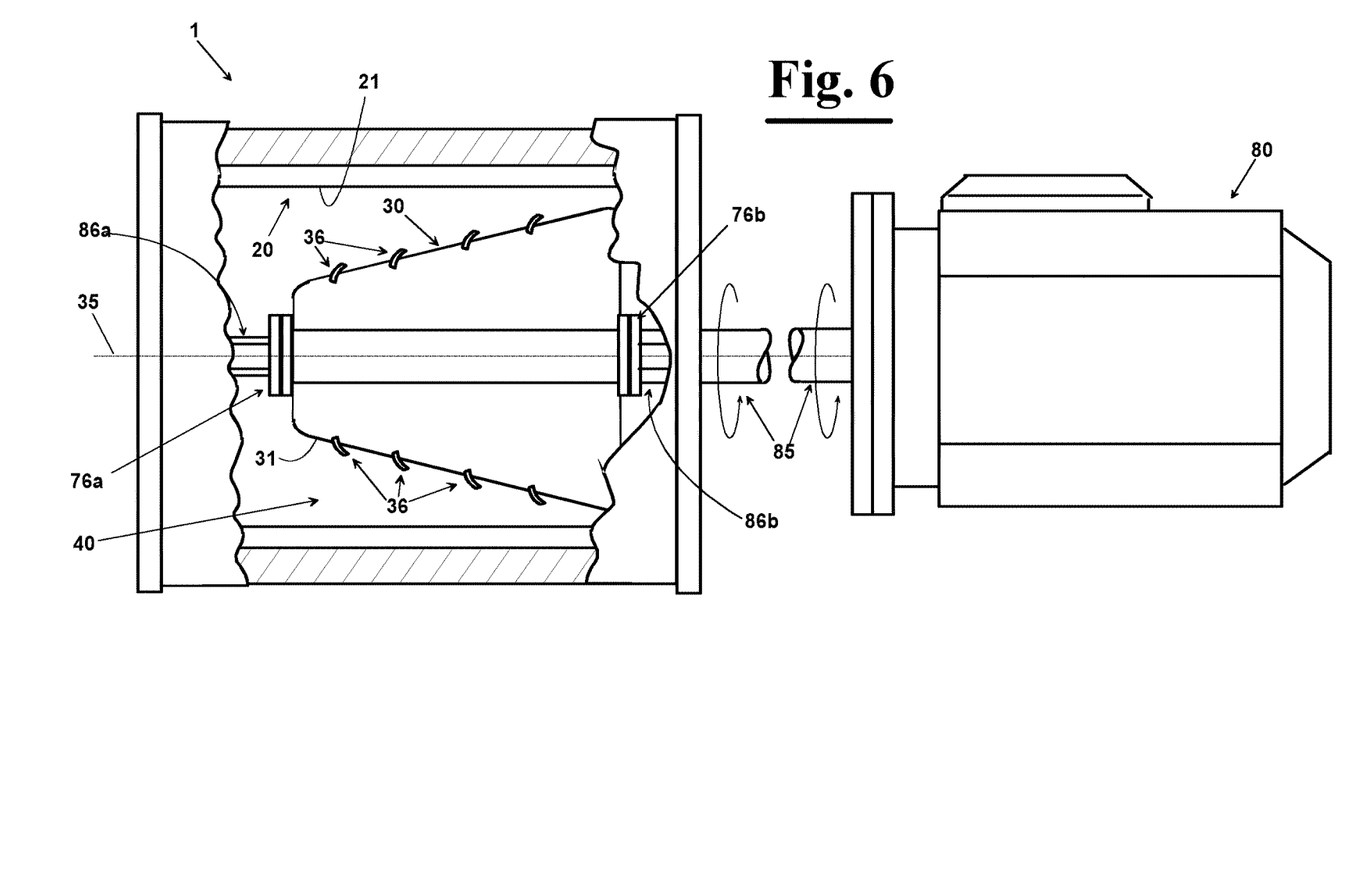
FIGS. 6 and 7 diagrammatically show in elevational side views partially sectioned, two alternative embodiments provided by the invention for the treatment machine of FIG. 1.
Figure 7:
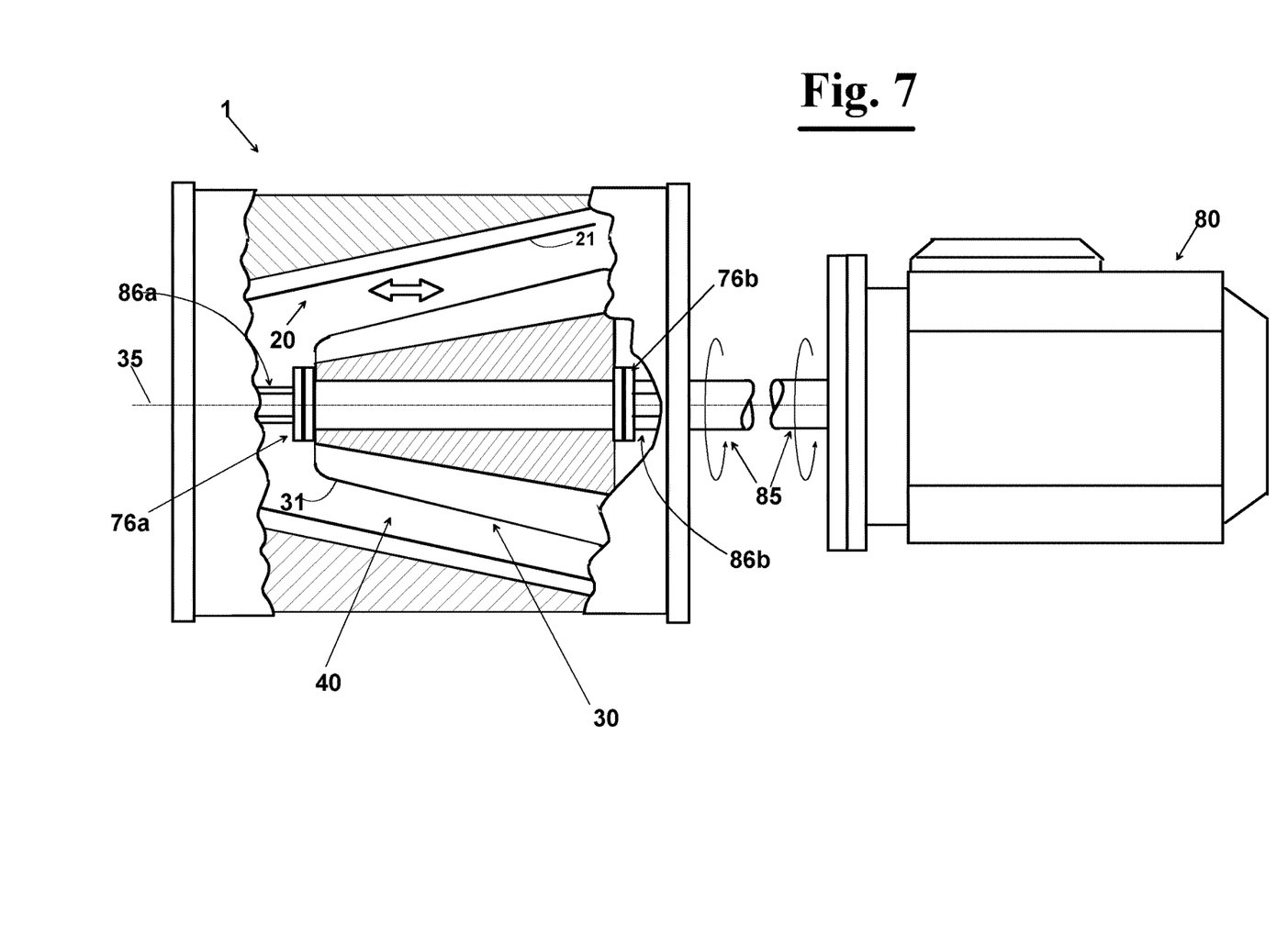

As diagrammatically shown in FIG. 6, in an advantageous embodiment, the external surface 31 of the rotor 30 is provided with a plurality of protruding members 36 arranged to produce a rotation movement on the product positioned in the cavity, in such a way to increase the effectiveness of the crushing force exerted on the treated vegetable food product.

In particular, each protruding member 36 can be twist-shaped, i.e. bent, and oriented in the direction of the advancing of the product 100 through the cavity 40. In this way, the protruding members 36 produce also an advancing impulse on the product 100 that assists its advancing along the treatment cavity 40. For example, the protruding members 36 can protrude of 10-20 mm from the surface 31 of rotor 30.

According to another aspect of the invention, a movement device 70 is provided arranged to relatively move rotor 30 and stator 20 along an axial direction in order to position them in a predetermined relative axial position. More in detail, removable blocking members are provided arranged to block the rotor 30 with respect to the stator 20 in the selected predetermined relative axial position.

In particular, the rotor 30 can be mounted on the rotation shaft 85 with freedom to move axially with respect to the same. In this way, the rotor 30 can be provided to be able to slide along the shaft 85 in such a way that it can be positioned in a predetermined axial position with respect to stator 20. More precisely, blocking members can be provided, for example a first and a second threaded ring nut 75a and 75b positioned at opposite sides of the rotor 20 and arranged to make a threaded connection with a respective threaded portion 86a and 86b of the rotation shaft 85. In this way it is possible to block the rotor 30 in the above disclosed predetermined position preventing a further sliding of the same along the shaft 85.

This constructive solution allows, in particular in the embodiment shown in the FIGS. 7 to 11, in which also the stator 20 has a conical shape, to adjust the distance between the internal surface 21 of stator 20 and the external surface 31 of rotor 30, i.e. to adjust the size of the treatment cavity 40.

Figure 8:
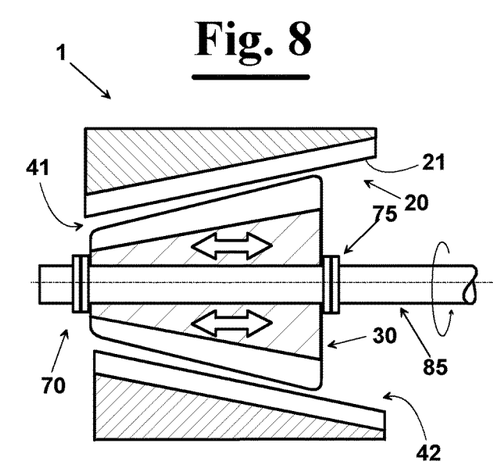
FIG. 8 diagrammatically shows in a partially sectioned view the machine of FIG. 7 in a first operating configuration.
Figure 9:
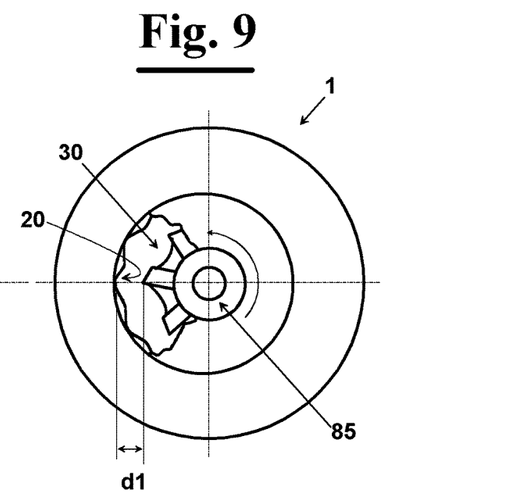
FIG. 9 shows a view of the inlet mouth of the treatment machine of FIG. 9.

In particular, in FIG. 8 a first axial portion is diagrammatically shown in which the rotor 30 can be positioned with respect to the stator 20. In this operating configuration, the treatment cavity 40 has a first size d1 (FIG. 9).

Figure 10:
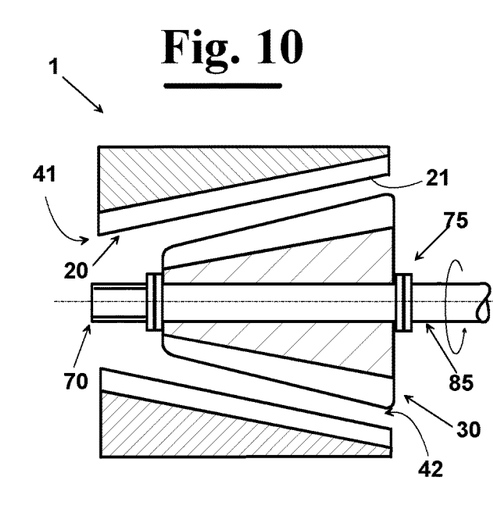
FIG. 10 diagrammatically shows in a partially sectioned view the machine of FIG. 7 in a second operating configuration.
Figure 11:
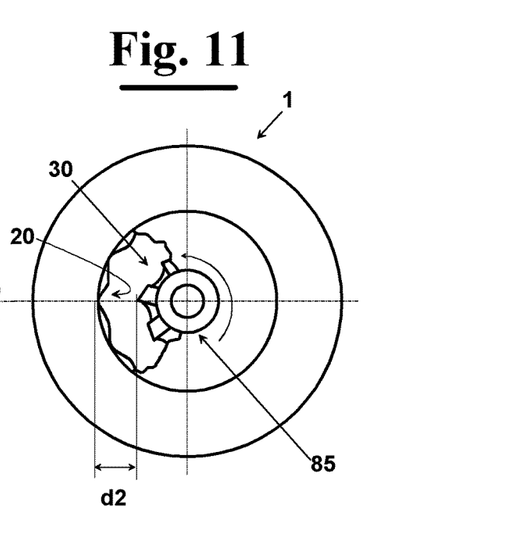
FIG. 11 shows a view of the inlet mouth of the treatment machine of FIG. 10.

In FIG. 10 is diagrammatically shown a second axial position, in which the rotor 30 can be positioned with respect to the stator 20, in particular axially translating the rotor 30 starting from the position of FIG. 8. In this operating configuration, the treatment cavity 40 has a second size d2, and precisely a size d2>d1 (FIG. 11).

In this way, it is, therefore, possible to adjust machine 1 in order to adapt it to different working needs, in particular to the different typologies of products to be treated. In fact, it is possible to adjust the size of the cavity 40, for example in function of the size of the stone 102, or the size of the central part 103, in particular comprising the stones 102, of the treated fruit. As above disclosed, in fact, machine 1, according to the invention, is arranged to cause a selective crushing of the treated product that involves the fleshy part 101 of the fruit, but not the stone 102, or however the central part 103, of the same.

The movement device 70 is arranged to position the stator 20 and the rotor 30 in a relative axial position in which the distance between the internal surface 21 of the stator 20 and the external surface 31 of the rotor 30, and therefore, the width of the treatment cavity, is substantially equal to the size of the stone of the treated fruit, or of the central part, or core, of the apple, or of the pear, that has not to be crushed by the treatment machine. In this way, it is avoided that fragments of the stone can "pollute" the final product of the process. If the movement device 70 is not present, said distance can be chosen in a planning stage on the basis of treatment to which the machine 1 is destined.

In a further embodiment a plurality of interchangeable rotors 30 is provided. In particular, the different rotors 30 have a different size with respect to each other, in particular a different conicity. In this case, the user will mount in the machine 1, a rotor 30 selected among the plurality of available rotors 30, and having the above disclosed characteristics, i.e. able to cause the crushing of the fleshy part of the fruit only, but not of the central part 103. Therefore, the selection is carried out on the basis of the treated product.

In an embodiment of the invention, not shown in the figures for reasons of simplicity, the plurality of rotors 30 can be arranged in a storehouse and a selection device can be provided arranged to select a determined rotor 30 among the plurality of rotors 30.

Figure 12:
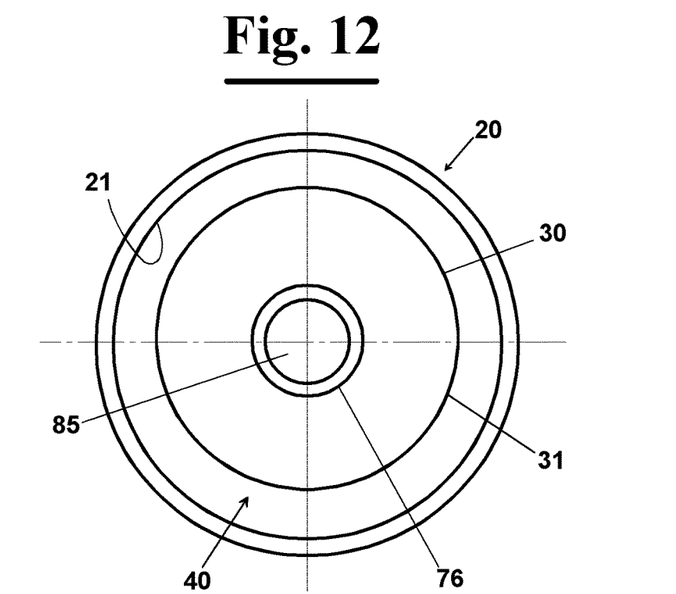
FIG. 12 shows a view of the inlet mouth of the treatment machine of FIG. 1.

As diagrammatically shown in FIG. 12, the internal surface 21 of stator 20 can be smooth. In this case, the treatment cavity 40 is a circular ring, because it is defined between two circumferences, i.e. the internal surface 21 of stator 20 and the external surface 31 of rotor 30, having both a circular shape.

Figure 13:
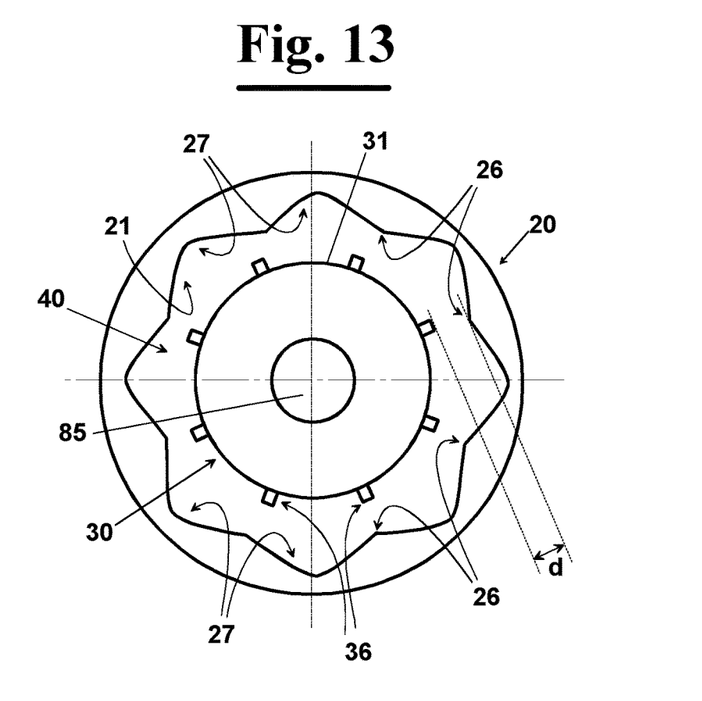
FIG. 13 shows a view of the inlet mouth of a treatment machine alternative to that of FIG. 12.

Alternatively, the internal surface 21 of stator 20 can be shaped and, in particular, provided with a plurality of protuberances 26 alternated to a plurality of recesses 27 (FIG. 13). In this case the distance d between the circumference passing through the protuberances 26 and the surface 31 of rotor 30 is such that it substantially corresponds to the size of the stone 102 of the treated fruit, or the central part, or core, 103 of the same. In this way, the stone 102, or the central part, or core, 103 of the fruit is not involved in the crushing by machine 1.

Figure 14:
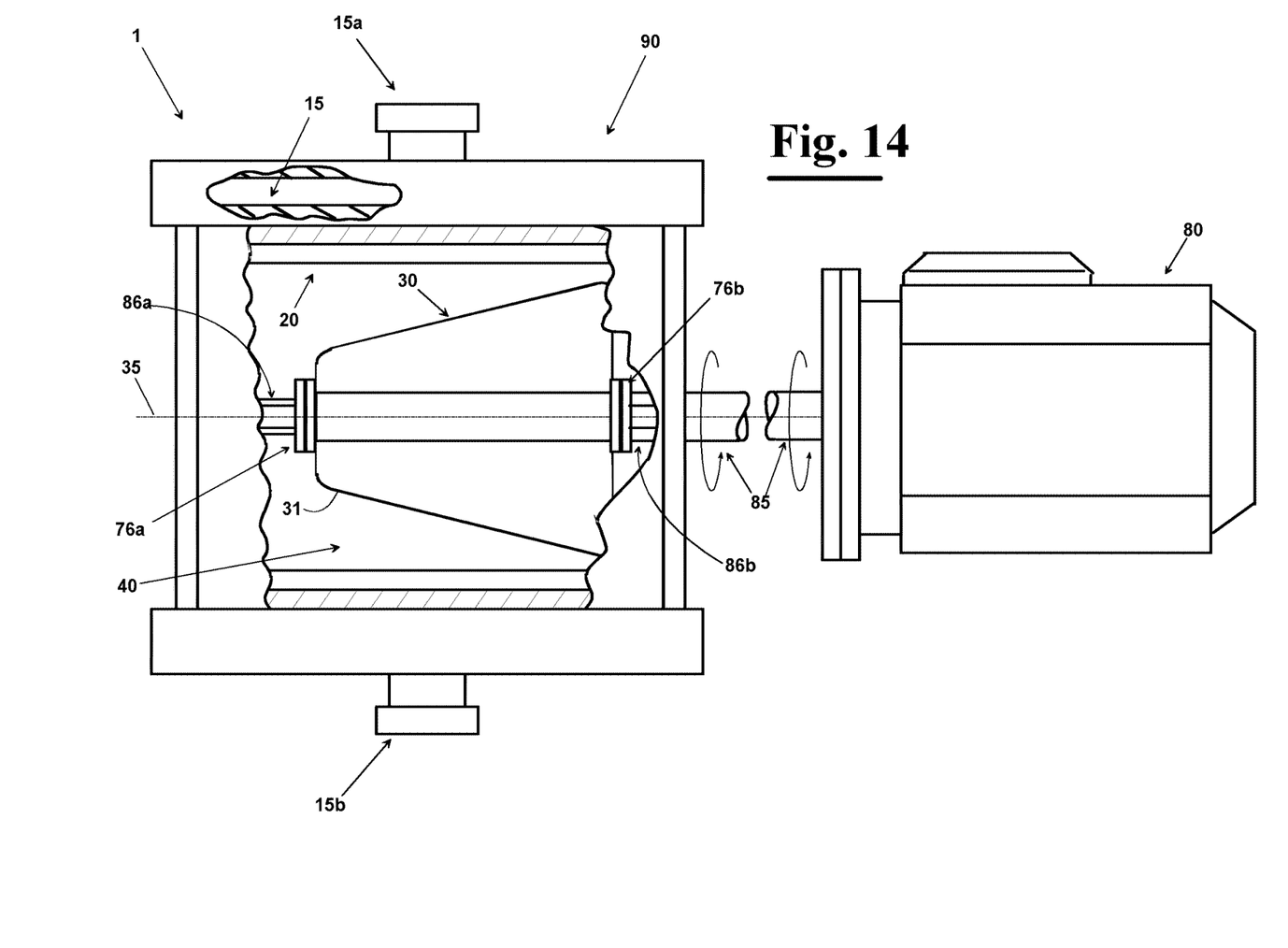
FIG. 14 diagrammatically shows in a elevational side view partially sectioned, a further embodiment of the machine of FIG. 1.

In the embodiment of FIG. 14, the machine 1 is provided with a heating device 90, for example an external heating jacket 15, which encircles stator 20 and that is crossed, in use, by a heating fluid. This can be introduced, for example, in the heating jacket 15 through an inlet 15a and exit through an outlet 15b as diagrammatically shown in FIG. 14. In this way, it is possible, to exert also an heating action on the product 100 that is treated in order to assist the softening by the machine 1, in particular if a partially frozen product is fed.

Figure 15:
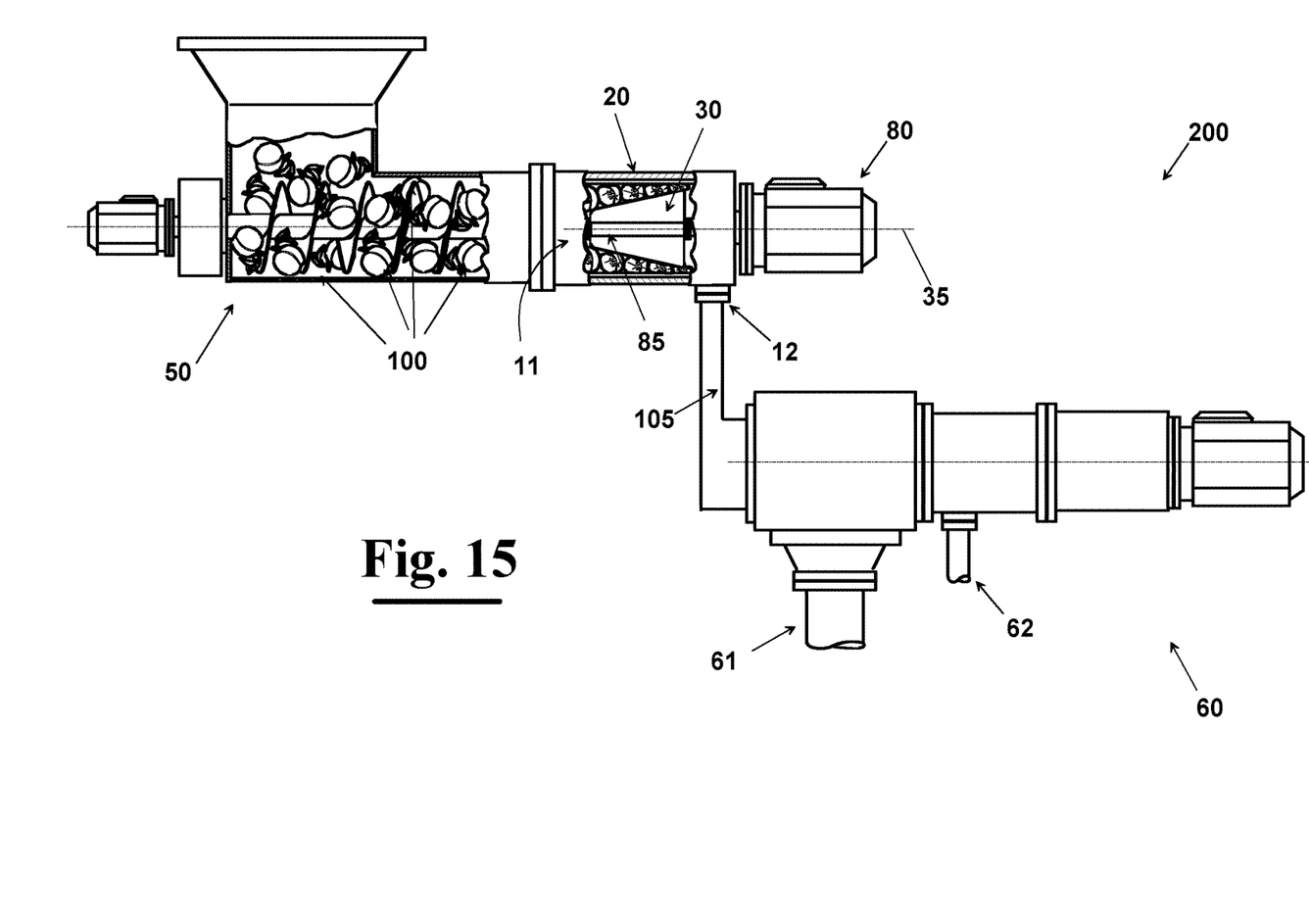
FIG. 15 diagrammatically shows in a elevational side view a plant, according to the invention, for treating a food product of vegetable origin for obtaining puree, or juice.

In FIG. 15, a plant 200 for treating food product of vegetable origin 100 is diagrammatically shown. The plant 200 comprises a treatment machine 1 as above disclosed with reference to figures and a separation machine 60 positioned downstream of the treatment machine. More in detail, the separation machine 60 is arranged to separate the treated product 105 of vegetable origin exiting the machine 1 in a main product comprising puree, or juice, which exits the machine 60 through a first outlet 61, and in a waste product, which, instead, exits through an outlet 62. For example, the separation machine 60 can be an extracting machine of the type, for example, disclosed in U.S. Pat. No. 4,643,085 in the name of the same Applicant.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. A machine for preparing vegetable pulp destined to the extraction of juice or puree, or both, from a food product of vegetable origin having a fleshy part, or mesocarp, and a central part, or endocarp, said machine comprising:
   a fixed hollow body, or stator, comprising an internal surface;
   a rotor that is interchangeable with rotors of differing sizes;
   wherein the rotor has a conical shape and is pivotally mounted about a rotation axis within said fixed hollow body, said rotor having an external surface, wherein a treatment cavity is defined between said internal surface of said stator and said external surface of said rotor, said treatment cavity comprising an inlet mouth and an outlet mouth, said inlet mouth having a size that is greater than a size of said outlet mouth;
   a motor group arranged to cause said rotor to rotate about a rotation axis;
   a pushing device arranged to feed said food product in said treatment cavity through said inlet mouth, said rotor and a push of said pushing device being configured to cause a selective crushing of said food product that does not involve the central part, or endocarp, of the food product when the food product crosses said treatment cavity;
   wherein, based on the size of the rotor, the internal surface of the stator and the external surface of the rotor are positioned at a distance greater than, or equal to, an average value of a size of the central part, or endocarp, of the food product, causing a crushing of the fleshy part of the food product, but not of the central part, or endocarp; and blocking members arranged to block said rotor with respect to said stator in a predetermined relative axial position.

2. The machine according to claim 1, wherein said size of the central part, or the endocarp, of the treated fruit, is selected on the basis of predetermined experimental data arranged to associate an average value of the size of the central part, or endocarp, to each treated fruit.

3. The machine according to claim 1, wherein said external surface of said rotor comprises a plurality of protruding members arranged to produce a rotation movement on said product positioned in said treatment cavity, to increase the effectiveness of the crushing force exerted on said treated vegetable food product.

4. The machine according to claim 3, wherein each one of the plurality of protruding members has a curved shape configured in such a way to adjust the advancing speed of the vegetable food product through said treatment cavity.

5. The machine according to claim 1, wherein said rotor is mounted on a rotation shaft, and wherein the rotor is able to move axially with respect to the rotation shaft, to position said rotor in a predetermined relative axial position with respect to said stator.

6. The machine according to claim 1, wherein said internal surface of said stator is conical-shaped.

7. The machine according to claim 1, wherein said internal surface of said stator comprises a plurality of protuberances and a plurality of recesses, and wherein a distance between the protuberances and said surface of said rotor is equal to the size of the central part, or endocarp, of the treated fruit.

8. The machine according to claim 1, further comprising a heating device to heat the treated product.

9. The machine according to claim 8, wherein said heating device comprises an external heating jacket, wherein said external heating jacket surrounds said stator and is crossed by a heating fluid.

10. A treatment plant comprising the machine according to claim 1.

11. The machine according to claim 1, wherein said blocking members comprise a first and a second threaded ring nut positioned at opposite sides of the rotor, said first and said second threaded ring nut arranged to carry out a threaded connection with a respective threaded portion of said rotation shaft, in such a way to block said rotor in said predetermined position preventing a further sliding of the same along said rotation shaft.

12. The treatment plant according to claim 10, further comprising a separation machine positioned downstream of said machine, and arranged to separate said treated product exiting said machine through said outlet, into a waste product and into a main product comprising puree or juice.

* * * * *